(12) United States Patent
McLawhorn et al.

(10) Patent No.: US 9,675,010 B2
(45) Date of Patent: Jun. 13, 2017

(54) CROP PROCESSING AND/OR CONVEYING ELEMENT FOR A FORAGE CHOPPER

(71) Applicant: DEERE & COMPANY, Moline, IL (US)

(72) Inventors: Patrick McLawhorn, Zweibruecken (DE); Joshua D. Bacon, Johnston, IA (US)

(73) Assignee: DEERE & COMPANY, Moline, IL (US)

( * ) Notice: Subject to any disclaimer, the term of this patent is extended or adjusted under 35 U.S.C. 154(b) by 62 days.

(21) Appl. No.: 14/310,896

(22) Filed: Jun. 20, 2014

(65) Prior Publication Data

US 2014/0373501 A1 Dec. 25, 2014

(30) Foreign Application Priority Data

Jun. 21, 2013 (DE) .................. 10 2013 211 774

(51) Int. Cl.
| | | |
|---|---|---|
| *A01F 29/09* | (2010.01) | |
| *A01F 29/02* | (2006.01) | |
| *A01F 29/06* | (2006.01) | |
| *B02C 18/18* | (2006.01) | |

(52) U.S. Cl.
CPC .............. *A01F 29/09* (2013.01); *A01F 29/02* (2013.01); *A01F 29/06* (2013.01); *B02C 18/18* (2013.01)

(58) Field of Classification Search
CPC ...................... A01F 29/00–29/22; B02C 18/18
USPC ........................................................ 241/294
See application file for complete search history.

(56) References Cited

U.S. PATENT DOCUMENTS

| 2,115,234 A | * | 4/1938 | Preston .................... A01F 29/02 |
| | | | 241/186.4 |
| 2,335,249 A | * | 11/1943 | Hawkins ................. A01B 35/26 |
| | | | 125/40 |
| 3,023,490 A | * | 3/1962 | Dawson ............... B23D 61/028 |
| | | | 428/556 |
| 3,214,106 A | | 10/1965 | Gorman |
| 3,321,145 A | * | 5/1967 | Gorman ................ B26D 7/2614 |
| | | | 144/162.1 |
| 3,635,271 A | * | 1/1972 | Markham ............. A01F 29/095 |
| | | | 241/101.762 |
| 3,779,123 A | * | 12/1973 | Chafee ..................... B26D 1/38 |
| | | | 241/221 |
| 3,805,660 A | * | 4/1974 | Burrough .............. A01F 29/095 |
| | | | 241/101.762 |

(Continued)

FOREIGN PATENT DOCUMENTS

| DE | 3713335 A1 | 1/1988 |
| DE | 202007011503 U1 | 10/2007 |

(Continued)

OTHER PUBLICATIONS

European Search Report Dated Mar. 2, 2015 in Foreign Counterpart Application No. 14169219.4 (5 pages).

*Primary Examiner* — Robert Pezzuto
*Assistant Examiner* — Adam Behrens

(57) ABSTRACT

A crop processing and/or conveying element for a forage chopper has a body that can be mounted on a carrier that can be set in rotation and is furnished with a hard material layer that comes into contact with crop during operation. The hard material layer is connected in a form-fitting manner to the body.

19 Claims, 5 Drawing Sheets

(56) References Cited

U.S. PATENT DOCUMENTS

| | | | | |
|---|---|---|---|---|
| 3,946,474 | A * | 3/1976 | Hahn | B23C 5/242 |
| | | | | 144/218 |
| 3,975,891 | A | 8/1976 | Gunther | |
| 4,036,095 | A * | 7/1977 | Huber | B26D 7/2614 |
| | | | | 83/674 |
| 4,038,880 | A * | 8/1977 | Garrison | A01D 69/00 |
| | | | | 474/5 |
| 4,090,674 | A | 5/1978 | Marshall et al. | |
| 4,257,566 | A * | 3/1981 | Lawrence | B02C 18/186 |
| | | | | 241/221 |
| 4,319,718 | A * | 3/1982 | Snavely | A01F 29/22 |
| | | | | 241/101.2 |
| 4,428,260 | A * | 1/1984 | Eby | B23P 15/40 |
| | | | | 172/747 |
| 4,498,549 | A * | 2/1985 | Jurgens | E21B 10/5676 |
| | | | | 175/430 |
| 4,770,253 | A * | 9/1988 | Hallissy | E01H 5/061 |
| | | | | 172/701.3 |
| 5,240,192 | A * | 8/1993 | Tilby | A01F 29/095 |
| | | | | 144/174 |
| 5,544,826 | A * | 8/1996 | Klingler | A01F 29/095 |
| | | | | 241/242 |
| H1642 | H * | 4/1997 | Jenkins | E02F 5/104 |
| | | | | 172/699 |
| 5,779,167 | A * | 7/1998 | Wagstaff | A01F 29/095 |
| | | | | 241/242 |
| 5,829,700 | A * | 11/1998 | Pianca | A01F 29/06 |
| | | | | 241/242 |
| 6,454,195 | B1 * | 9/2002 | Amano | B02C 13/2804 |
| | | | | 144/241 |
| 6,857,255 | B1 | 2/2005 | Wilkey et al. | |
| 7,108,212 | B2 * | 9/2006 | Latham | E21C 35/1936 |
| | | | | 144/218 |
| 7,665,234 | B2 * | 2/2010 | Diehl | E02F 3/8157 |
| | | | | 172/701.3 |
| 8,109,176 | B1 * | 2/2012 | Kooima | A01F 29/06 |
| | | | | 76/104.1 |
| 2001/0002683 | A1 * | 6/2001 | Dykstra | A01F 29/095 |
| | | | | 241/242 |
| 2002/0179759 | A1 * | 12/2002 | Dillon | A01F 29/09 |
| | | | | 241/300 |
| 2006/0130452 | A1 * | 6/2006 | Pakura | A01D 43/08 |
| | | | | 56/16.4 R |
| 2006/0213342 | A1 * | 9/2006 | Turner | A01D 34/005 |
| | | | | 83/13 |
| 2007/0261867 | A1 * | 11/2007 | Techel | A01F 29/09 |
| | | | | 172/811 |
| 2010/0325902 | A1 * | 12/2010 | Dutta | B26B 9/00 |
| | | | | 30/346 |
| 2012/0018560 | A1 * | 1/2012 | Denis | A01G 23/00 |
| | | | | 241/282.2 |
| 2013/0233145 | A1 * | 9/2013 | Sotelo | B21K 11/00 |
| | | | | 83/835 |
| 2014/0027552 | A1 * | 1/2014 | Hinchliff | B27G 13/00 |
| | | | | 241/300 |

FOREIGN PATENT DOCUMENTS

| | | |
|---|---|---|
| DE | 102012201334 A1 | 8/2013 |
| EP | 0761089 A1 | 3/1997 |
| EP | 0789994 A1 | 8/1997 |
| EP | 1264535 A1 | 12/2002 |
| EP | 1935231 A1 | 6/2008 |
| EP | 2329705 A1 | 6/2011 |
| GB | 1332013 A | 10/1973 |

* cited by examiner

CROP PROCESSING AND/OR CONVEYING ELEMENT FOR A FORAGE CHOPPER

CROSS-REFERENCE TO RELATED APPLICATION(S)

This application claims priority under 35 U.S.C. §119 to German patent application DE 102013211774.4, filed Jun. 21, 2013, the disclosure of which is incorporated herein by reference.

STATEMENT OF FEDERALLY SPONSORED RESEARCH OR DEVELOPMENT

Not applicable.

FIELD OF THE DISCLOSURE

The disclosure relates to a crop processing and/or conveying element for a forage chopper, particularly a cutter, a conveyor paddle or a conveyor bar, with a body that can be mounted on a carrier that can be set in rotation and is furnished with a hard material layer that comes into contact with crop during operation.

BACKGROUND OF THE DISCLOSURE

Forage choppers are agricultural harvesting machines that pick up crop from a field, chop it and transfer it to a transport vehicle via an ejection pipe. The crop can consist of plants such as corn or grain still standing on the field, or of already cut plants gathered into a swath, particularly grass, and is generally used as animal feed or for generating biogas. The cutting process takes place by means of a rotating chopper drum with a plurality of cutters distributed about its circumference, which comminute the crop in cooperation with a shear bar.

The cutters are subject to considerable wear during operation, caused by the crop and impurities contained therein such as sand. Conveyor paddles for crop accelerators and conveyor bars for intake rollers are exposed to similar wear.

To extend the service life of the cutters, they have been equipped in the prior art with hard material coatings, which are applied by hardening, welding or other bonding methods to the surface of the knife that forms the cutting edge (cf. GB 1 332 013 A, EP 2 329 705 A1). The fixation of the hard material layer on the body of the cutter is thus based only on a material bond, which is not always sufficient under high stresses to retain the hard material layer strongly enough on the body. Thus there are occasionally more or less extensive detachments of the hard material coating, which reduces the service life of the cutters.

Embedding a cutting element between two cutter carriers for a straw chopper cutter of a combine (EP 1 935 231 A1) or providing a corresponding arrangement on a lawnmower cutter (U.S. Pat. No. 3,975,891 A) have also been proposed. Such cutters are not suitable for forage harvesters, because the cutting edge of the cutter must move very closely past a shear bar, which is not possible for a cutter element arranged between cutter carriers. The same applies to the above-mentioned conveyor paddles for accelerators and conveyor bars for intake rollers because they convey the crop with their leading surfaces, which is not possible with elements embedded between carriers.

Forage harvester shear bars with beveled corners have also been described, in which hard material inserts of tool steel are mounted by arc welding (cf. the prior art mentioned in EP 1 264 535 A1). It has also been proposed to form an axial recess in the body of the shear bar, into which a mounting is bolted, which in turn has an axial groove into which are inserted wear-resistant inserts made of sintered hard metal that form the shear bar edge (EP 0 761 089 A1). The hard material inserts are wedge-shaped with thicker ends at a distance from the shear bar edge and are fixed on the body of the shear bar by the bolts and the mount. The shear bars are fixed stationarily on the frame of the forage harvester and are substantially thicker than cutters, conveyor paddles or conveyor bars, so that easy transfer of this arrangement to the latter elements is not possible.

One problem addressed by the disclosure is considered to be that of providing a crop processing and/or conveying element for a forage harvester that is movable in operation and does not have the above-mentioned disadvantages or has them to a reduced extent.

SUMMARY OF THE DISCLOSURE

One aspect of the disclosure provides a crop processing and/or conveying element for a forage chopper, particularly a cutter, a conveyor paddle or a conveyor bar, which includes a body that can be mounted on a carrier that can be set in rotation and is furnished with a hard material layer that comes into contact with crop during operation. The hard material layer is connected in a form-fitting manner to the body.

In this way, the hard material layer is coupled to the body not only by a material bond but also by a form fit. The forces occurring during processing the crop, particularly cutting or conveying, are transmitted to the body by means the form fit of the hard material. Thus the strength of the hard material layer is improved and the service life of the crop processing and/or conveying element is lengthened.

In one possible embodiment, the hard material layer is arranged in a recess of the body. The forces from the hard material layer are transmitted from the wall and/or the bottom of the recess onto the body in this embodiment. The hard material layer can contact the recess with exactly two boundary surfaces, while the surfaces opposite these boundary surfaces generally do not contact the recess.

In another possible embodiment, a boundary surface between the body and the hard material layer, extending at least approximately radially relative to the rotational direction of the body, encloses an acute angle with a boundary surface extending at least approximately tangentially to the rotational direction of the body. Thus an acute angle is formed between the tangential and the radial boundary surface, into which the forces active while processing or conveying the crop press the hard material layer. The hard material layer is thus very securely fixed to the body. However, right angles or acute angles between the tangential and the radial boundary surface can also be conceived.

A boundary surface between the body and the hard material layer can be formed over the entire length or a part thereof in a straight line or profiled, particularly corrugated or a crenellated or in a sawtooth shape or a dovetail shape. A form-fit connection between the hard material layer and the body is produced by this profiling alternatively or additionally to the above-mentioned recess. The above-mentioned boundary surface can extend at least approximately tangentially to the rotational direction of the body, and/or it extends at least approximately radially relative to the rotational direction. The orientation of the above-mentioned boundary surface need not be exactly tangential or radial, but can deviate by an angle from the tangent or radial line relative to the rotational direction of the body. The profiling can be oriented in the rotational direction (i.e. in a radial plane, e.g. in the tangential or radial direction) or transversely thereto (i.e. axially) or diagonally (at an arbitrary angle which thus need not enclose exactly an angle of 45° with the rotation direction and the tangent or radial line).

The hard material layer can be constructed of several layers. They can be connected by forging, casting, sintering or gluing to the body. In addition, the hard material layer transverse to the direction of rotation can be constructed of several sections, which are interlocked with one another at their ends.

BRIEF DESCRIPTION OF THE DRAWING

Embodiments of the disclosure, to be described below, are shown in the drawings. Therein.

DETAILED DESCRIPTION

The following describes one or more example embodiments of the disclosed crop processing and/or conveying element for a forage chopper. Various modifications to the example embodiment(s) may be contemplated by one of skill in the art.

Figure 1:
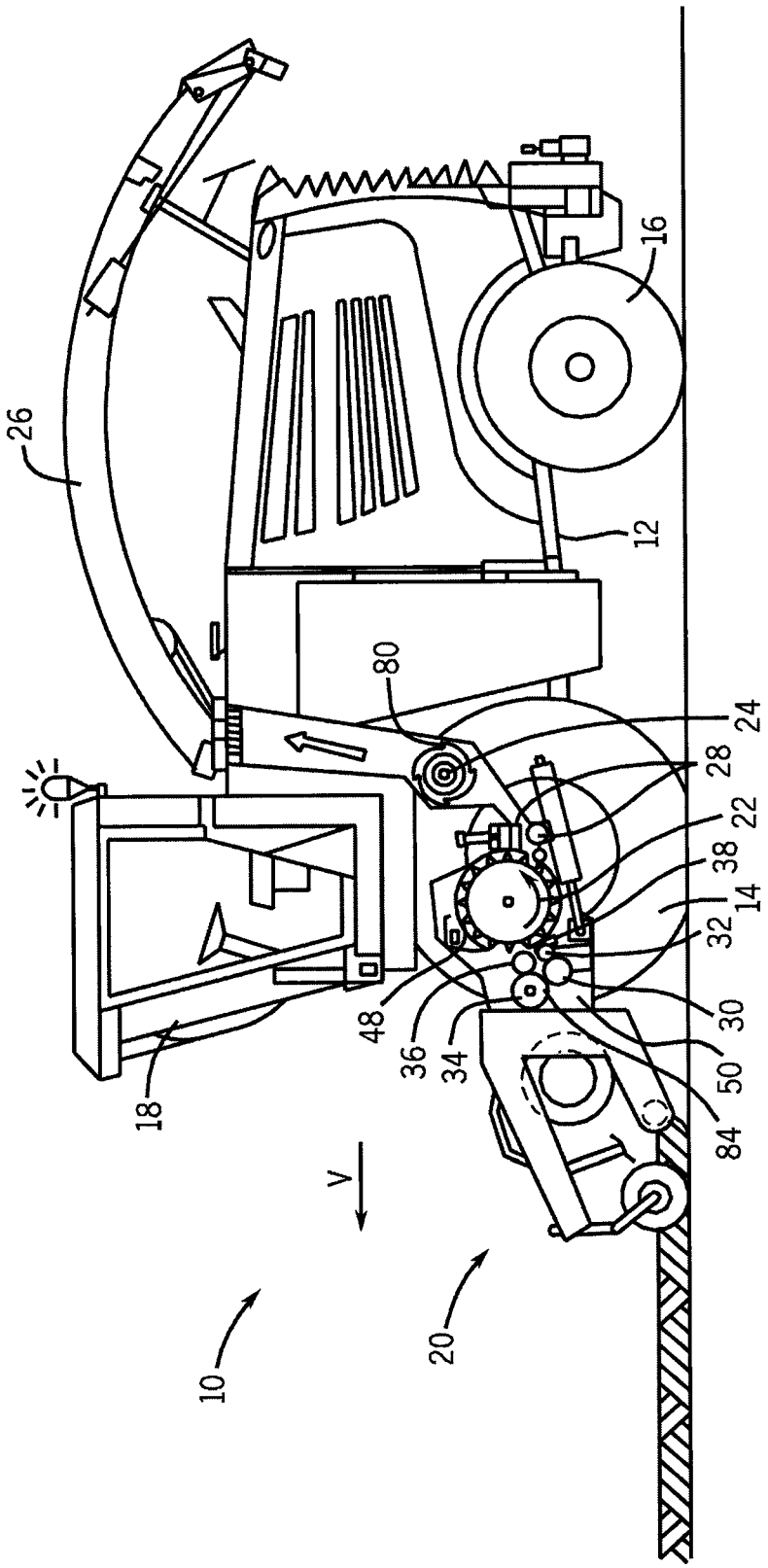
FIG. 1 shows a forage harvester in a side view and in a schematic representation.

A self-propelled forage harvester 10 shown in FIG. 1 is constructed on a frame 12, which is carried by front and rear wheels 14 and 16. The forage harvester 10 is operated from a driver's cab 18, from which a crop receiving device 20 in the form of a pickup can be seen. Material picked up from the ground by means of the crop receiving device 20, e.g. grass or the like, is fed to a chopping unit that is constructed here from a chopping drum 22 equipped with cutters 48, which chops the material into small pieces in cooperation with a shear bar 38 and supplies it to an accelerator 24. In other forage harvesters, particularly attached or towed forage harvesters, the chopping unit can consist of a disk chopper instead of a chopper drum 22. The material leaves the harvesting machine 10 for a trailer traveling alongside via a height-adjustable discharge chute 26 that is rotatable about the vertical axis. A post-comminution device 28, through which the material to be conveyed is supplied tangentially to the conveying device 24, is located between the chopper drum 22 and the accelerator 24.

Between the crop receiving device 20 and the chopper drum 22, the material is transported by an intake conveyor with lower intake rollers 30, 32 and upper intake rollers 34, 36, which are mounted inside an intake housing 50. The intake rollers 30-36 are also referred to as pull-in cylinders, because the upper intake rollers 34, 36 are pre-tensioned against the lower intake rollers 30, 32 by hydraulic and/or spring force, so that the crop is pre-compressed between the intake rollers 30-36 and can be cut better. Directional indications such as front and back refer below to the forward direction V of the forage harvester 10, which runs from right to left in FIG. 1.

Figure 2:
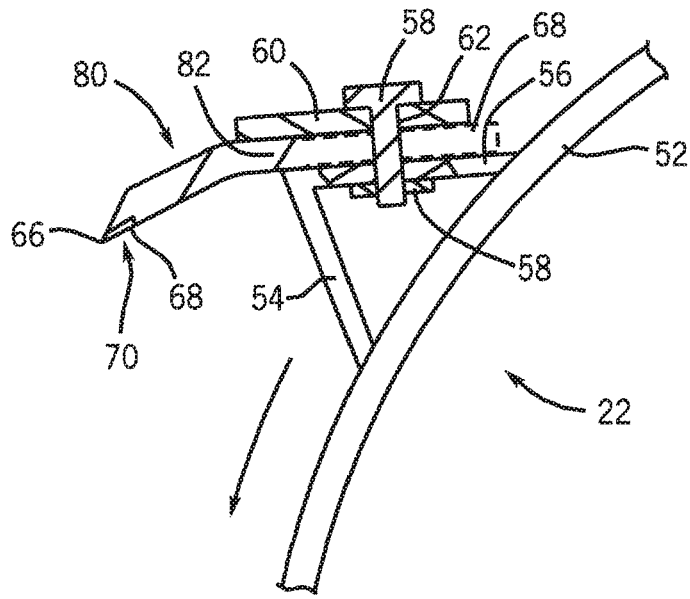
FIG. 2 shows a partial vertical section through the chopper drum and the mounting of the cutters thereon.

FIG. 2 shows a cutout of the chopper drum 22 with the cutter 48 mounted thereon. The chopper drum 22 comprises a cylindrical jacket 52, around the periphery of which and in the axial direction of which a plurality of angular carriers 54 are welded. In the trailing wall 56 of the carrier 54 drawn at the top in FIG. 2, three bores are arranged axially one alongside another, through each of which a bolt 58 extends that is bolted to a threaded bar 58 on the underside of the wall 56. The bolt 58 also extends through a bore 62 in a clamping bar 60 and a slotted hole 64 that extends transversely to the cutting edge 66 in the body 82 of the cutter 48. A washer (not shown) can be additionally arranged between the clamping bar 60 and the head of the bolt 58. The cutter 48 can also be used in any other desired type of chopper drum, e.g. with radially extending support discs on which the cutters 48 are mounted (e.g. EP 0 789 994 A1) or with helical cutting edges or with envelope curves describing a non-cylindrical envelope circle (DE 10 2012 201 334 A1).

Figure 3:
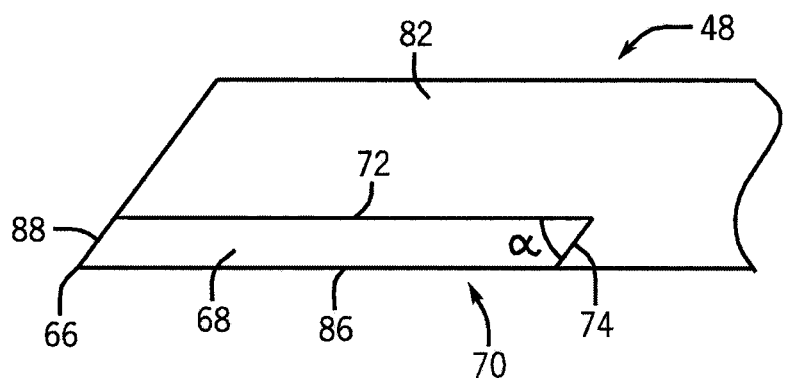
FIG. 3 shows an enlarged cutout of FIG. 2 in which the hard material layer and the matching recess in the body of the cutter are represented.

The cutter 48 is provided on its inner side with a hard material layer 68, which is arranged inside a corresponding recess 70 in the body 82 of the cutter 48. FIG. 3 shows the relevant portion of the body 82 in an enlarged representation. The recess 70 and the hard material layer 68 are separated by a first straight boundary surface 72 that is oriented approximately in the tangential direction (i.e. the circumferential direction of the envelope circle described by the cutting edge 66 during rotation of the chopper drum 22), and a second, shorter, and straight boundary surface 74, which is oriented approximately in the radial direction relative to the axis of rotation of the chopper drum 22. In another embodiment, the boundary surfaces 72, 74 can also be curvilinear (convex or concave) and/or connected by a radius to one another. The other surfaces of the block-like, relatively shallow hard material layer 68, i.e. the two surfaces 86, 88 adjoining the cutting edge 66, are not in the recess 70, however, but are instead free because cutting of the crop in combination with the shear bar 38 would not otherwise be possible. The remaining two surfaces of the hard material layer 68, which are the axial end faces relative to the axial direction of the chopper drum 22, can likewise be exposed or can contact the recess 70 at lateral edges (not shown).

The hard material layer 68 contacts the recess 70 (gap-free) on both boundary surfaces 72, 74. The angle α between the two boundary surfaces can be acute (less than 90°), so that a sharp corner is formed, into which hard material layer 68 is pressed by the forces arising while cutting, which run roughly in the direction of the first boundary layer 72. The hard material layer 68 is consequently form-fit into the recess 70, and the forces arising while cutting are transmitted by the form fit from the hard material layer 68 into the body 82. Thereby detachment of the hard material layer 68 from the body 82 need hardly be feared. The angle α could also be rectangular or acute, particularly if a form fit is produced by one of the boundary surfaces 72 or 74, as shown, for example, by the following embodiments.

Figure 4:
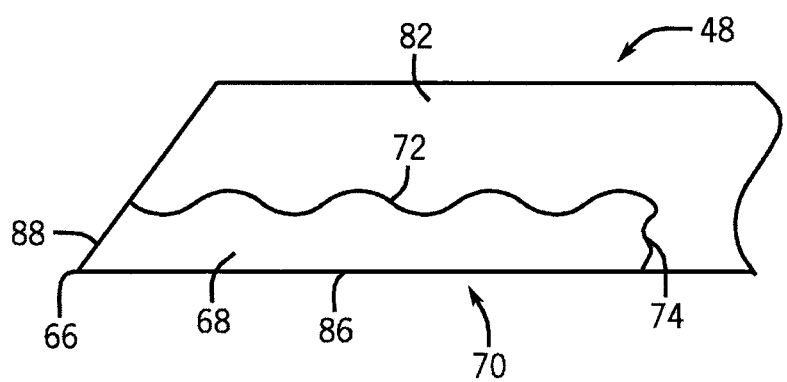
FIG. 4 shows a cross section through a second embodiment of a cutter.
Figure 5:
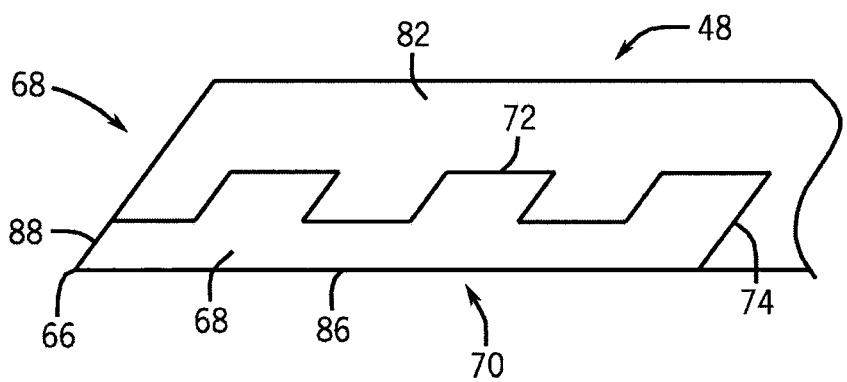
FIG. 5 shows a cross section through a third embodiment of a cutter.
Figure 6:
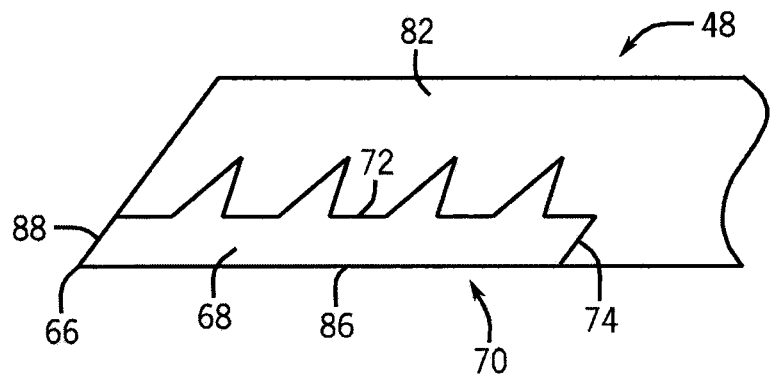
FIG. 6 shows a cross section through a fourth embodiment of a cutter.

In the embodiment according to FIG. 4, the boundary surfaces 72, 74 are corrugated, while the first tangential boundary surface 72 in the embodiment according to FIG. 5 has a crenellated shape, and is furnished in the embodiment according to FIG. 6 with grooves of triangular cross section or a sawtooth profile, which extend into the body 82. According to FIGS. 5 and 6, the second boundary surfaces 74 are each straight, but can also be curvilinear, crenellated, sinusoidal or sawtooth-shaped or have any other profile shape. Due to the profiling extending in the axial direction relative to the axis of rotation of the chopper drum 22 on the first tangential boundary surfaces 72 in the embodiments according to FIGS. 4-6, the forces arising while cutting are not transmitted only at the second, radial boundary surface 74 into the body 82 of the cutter 48 but also at the first, tangential boundary surface 72.

Figure 7:
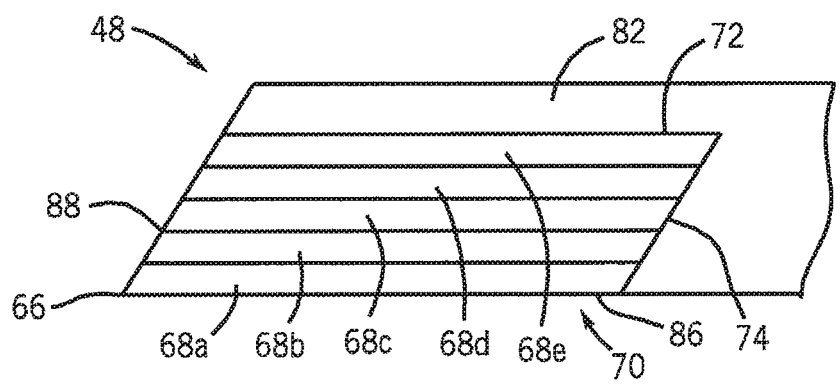
FIG. 7 shows a cross section through a fifth embodiment of a cutter.

In the embodiment according to FIG. 7, the hard material layer 68 consists of a plurality of separate hard material layers 68a-68e that are arranged one above another. The hard material layers 68a-68e can have identical or different wearing properties in order to make the abrasion properties of the cutter 48 at the wearing regions on the cutting edge 66 and at the surfaces 88 more uniform. Thus the sharpening frequency can be reduced or sharpening can be foregone entirely. Varying from that which is shown in FIG. 7, the individual layers 68a-68e can be connected one among another by profiled boundary surfaces 72, particularly as shown in FIGS. 4-6 and 8. One or more hard material layers (not shown) with the same or different wearing properties as compared to the hard material layers 68a-68e can also be applied to the upper and/or front side of the body 82, which would also be possible with the other illustrated embodiments.

Figure 8:
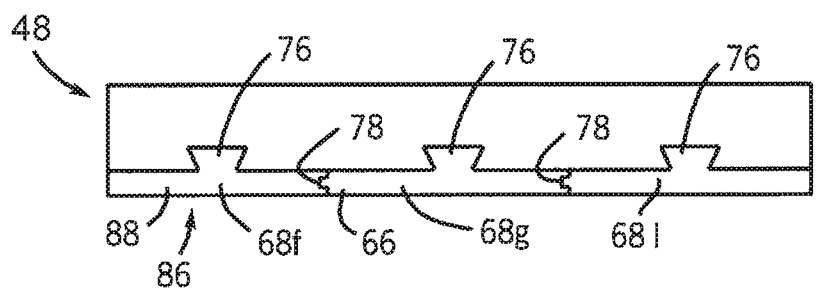
FIG. 8 shows a front view of a sixth embodiment of a cutter.

In the embodiment according to FIG. 8, which (varying from FIGS. 1-7) shows the cutter 48 in a front view, three hard material layers 68f, 68g, 68h are arranged laterally one alongside another. It can also be conceived to arrange two or more than three hard material layers one alongside another. The hard material layers are interlocked with one another at their adjoining ends by suitable features 78 in the form of grooves and protruding areas. In the embodiment according to FIG. 8, dovetail-shaped grooves 76 extending in the tangential direction, into which the hard material layers 68g-68h extend, are also provided in the body 82. The form fit can also be achieved here by a curvilinear, crenellated, sinusoidal or sawtooth shape or any other profile shape of the grooves 76. Such dovetail-shaped grooves 76 could also run in the axial direction and be used in the embodiments according to FIGS. 4-6. This dovetail shape also secures the hard material layer 68 against forces running downward in FIG. 8 and ensures particular stability of the hard material layer 68.

Figure 9:
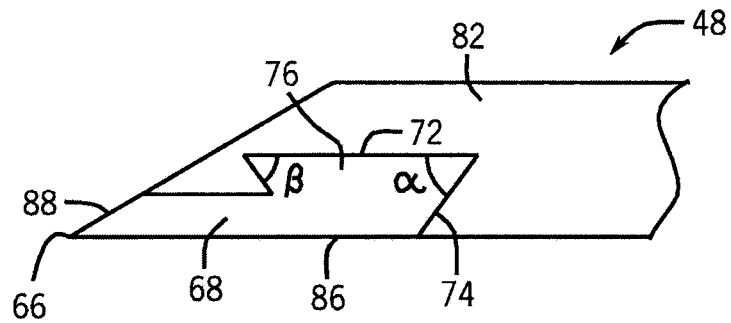
FIG. 9 shows a cross section through a seventh embodiment of a cutter.

In the embodiment according to FIG. 9, a dovetail-shaped groove 76, into which the hard material layer 68 extends, is provided in the body 82. The form fit can alternatively also be achieved here by a curvilinear shape, a crenellated shape, a sinusoidal shape, a sawtooth shape or any other profile shape of the groove 76. Such an embodiment absorbs the forces arising opposite to the cutting direction, for example the forces arising during the sharpening process, and ensures particular stability for the hard material layer. The angle β here is likewise can be acute (less than 90°), but can also be obtuse (greater than 90°), particularly if a form fit is produced at a different point of the boundary surface 72.

Figure 10:
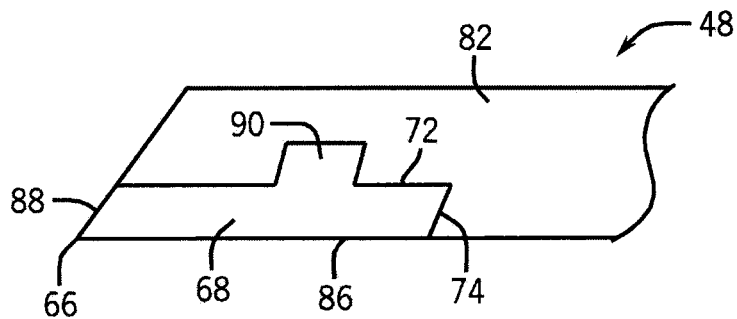
FIG. 10 shows a cross section through an eighth embodiment of a cutter.
Figure 11:
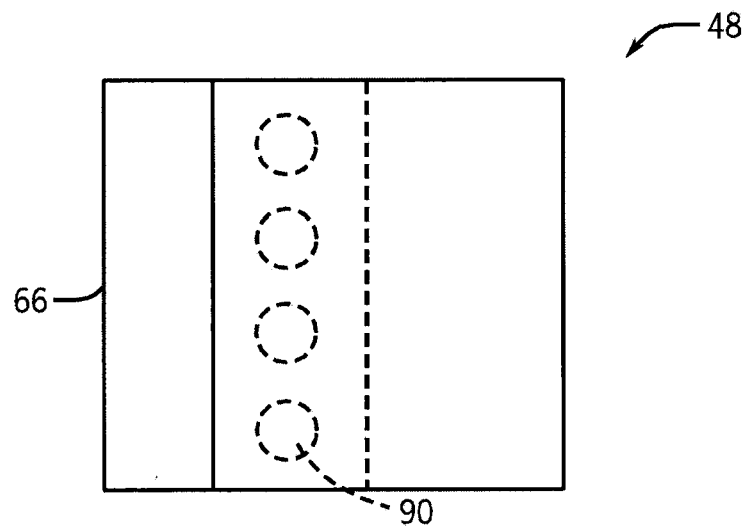
FIG. 11 shows a plan view of the cutter from FIG. 10.

In the embodiment according to FIGS. 10 and 11, cylindrical holes 90, into which the hard material layer 68 extends in the shape of knobs, are provided in the body 82 rather than grooves. Alternatively (not shown here), the body 82 and the hard material layer 68 can be provided with a bore, through which the body 82 and the hard material layer 68 are pegged with one or more pins and are fixed, in order to further secure the hard material layer. The pin can penetrate into the hard material layer 68 or pass through it. The circumferential surface of the holes 90 and the knobs and the pins can be round, but can also be elliptical, corrugated, sawtooth-shaped, stepped or profiled in some other way.

The hard material layer 68 can be connected to the body 82 by means of forging, casting or gluing, although any other desired methods such as welding or soldering can be conceived.

Figure 12:
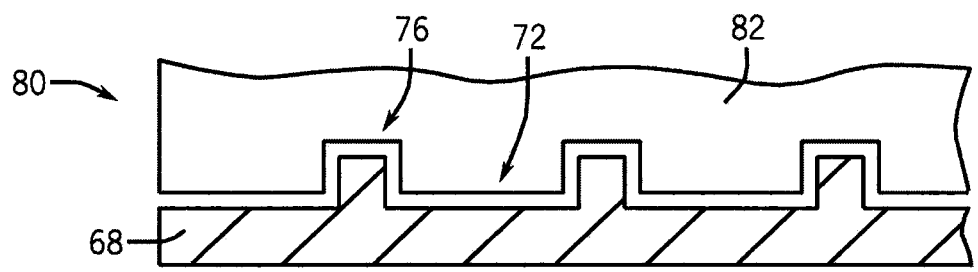
FIG. 12 shows a cross section through a first embodiment of a paddle for an accelerator.
Figure 13:
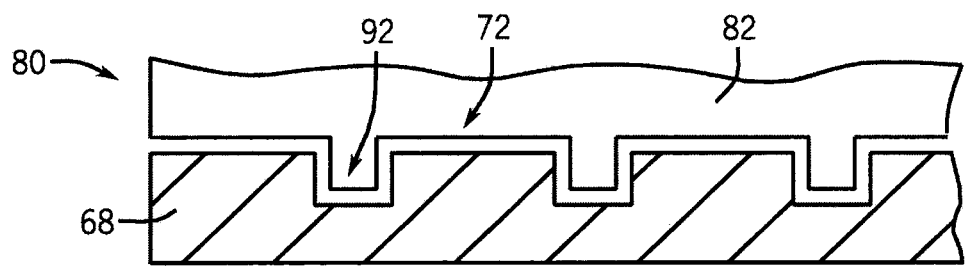
FIG. 13 shows a cross section through a second embodiment of a paddle for an accelerator.

The hard material layers 68 as described, which are arranged in a recess 70 of the body 82, can be used not only on the cutters 48 of the chopper drum 22, but also with the leading surfaces interacting with the crop on the paddles 80 of the accelerator 24 or on conveyor bars 84 of the intake rollers 30-34. Particularly for paddles 80 of the accelerator 24 or conveyor bars 84 of the intake rollers 30-34, but also for the cutters 48, the hard material layers 68 can extend over the entire leading surface or a part thereof, but the latter need not necessarily be provided with a recess 70 for receiving the hard material layer 68. Then the fixation of the hard material layer 68 on the body 82 is accomplished only at the remaining boundary surface 72 between the hard material layer 68 and the body 82 by profiling provided there, for example with grooves 76 oriented in the axial, radial or diagonal direction (as shown in FIG. 12), or elevations 92 (as shown in FIG. 13), each of which produce the form fit according to the disclosure.

Although the disclosure was described based on the above example(s), in light of the preceding description and the drawing, one of skill in the art will understand that many different alternatives, modifications and variants may fall within the invention defined by the following claims.

What is claimed is:

1. A crop processing element for a forage chopper, comprising:
   at least one of a conveyor paddle and a conveyor bar, with a body that can be attached to a carrier that can be brought into rotation, and
   wherein the body is furnished with a material layer that comes into contact with crop during operation, the material layer is arranged in a recess of the body, and the material layer is connected in a form-fitting manner to the body,
   wherein a boundary surface between the body and the material layer is formed over at least a part of the length of the body, the boundary surface including one of a profiled corrugated, crenellated, sawtooth and dovetail shape, and
   wherein the material layer is constructed transversely to the rotational direction, the material layer including a plurality of sections that are interlocked with one another at their ends in the form of grooves and protruding areas.

2. The crop processing element according to claim 1, wherein the material layer contacts the recess at two boundary surfaces.

3. The crop processing element according to claim 2, wherein the material layer is block-shaped and has a cutting edge, and wherein and the surfaces of the material layer adjacent to the cutting edge do not contact the recess.

4. The crop processing element according to claim 1, wherein a boundary surface between the body and the material layer running radially relative to the rotational direction of the body encloses an acute angle (α) with a boundary surface between the body and the material layer that extends tangentially relative to the rotational direction of the body.

5. The crop processing element according to claim 1, wherein the boundary surface extends at least one of: at least approximately radially with respect to the rotational direction of the body and at least approximately tangentially to the rotational direction of the body.

6. The crop processing element according to claim 1, wherein the material layer is constructed of a plurality of layers with one of identical and different properties, the plurality of layers connected to each other by the profiled shape.

7. The crop processing element according to claim 1, wherein the material layer is connected to the body by at least one of forging, sintering and gluing.

8. A forage harvester, including a crop processing element comprising:
  at least one of a conveyor paddle and a conveyor bar, with a body that can be attached to a carrier that can be brought into rotation, and
  wherein the body is furnished with a material layer that comes into contact with crop during operation, the material layer is arranged in a recess of the body, and the material layer is connected in a form-fitting manner to the body,
  wherein a boundary surface between the body and the material layer is formed over at least a part of the length of the body, the boundary surface including one of a profiled corrugated, crenellated, sawtooth and dovetail shape, and
  wherein the material layer is constructed transversely to the rotational direction, the material layer including a plurality of sections that are interlocked with one another at their ends in the form of grooves and protruding areas.

9. The crop processing element according to claim 1, wherein the profiled shape is oriented in radial direction.

10. The crop processing element according to claim 1, wherein the profiled shape is oriented axially.

11. The crop processing element according to claim 1, wherein the boundary surface includes a profiled corrugated shape.

12. The crop processing element according to claim 1, wherein the boundary surface includes a profiled crenellated shape.

13. The crop processing element according to claim 1, wherein the boundary surface includes a profiled sawtooth shape.

14. The crop processing element according to claim 1, wherein the boundary surface includes a profiled dovetail shape.

15. A crop processing element for a forage chopper, comprising:
  at least one of a conveyor paddle and a conveyor bar, with a body attached to a rotational carrier, and
  wherein the body is furnished with a material layer that comes into contact with crop during operation, the material layer is arranged in a recess of the body, and the material layer is connected in a form-fitting manner to the body,
  wherein a boundary surface between the body and the material layer is formed over at least a part of the length of the body, the boundary surface including one of a profiled corrugated, crenellated, sawtooth, and dovetail shape, the profiled shape oriented in the axial direction, and
  wherein the material layer is constructed transversely to the rotational direction, the material layer including a plurality of sections that are interlocked with one another at their ends in the form of grooves and protruding areas.

16. The crop processing element according to claim 15, wherein the boundary surface includes a profiled corrugated shape.

17. The crop processing element according to claim 15, wherein the boundary surface includes a profiled crenellated shape.

18. The crop processing element according to claim 15, wherein the boundary surface includes a profiled sawtooth shape.

19. The crop processing element according to claim 15, wherein the boundary surface includes a profiled dovetail shape.

* * * * *